(12) United States Patent
Taylor et al.

(10) Patent No.: US 7,417,738 B2
(45) Date of Patent: Aug. 26, 2008

(54) DETERMINING SURFACE PROPERTIES OF A ROADWAY OR RUNWAY FROM A MOVING VEHICLE

(75) Inventors: Charles Leonard Taylor, Dunrohin (CA); Daniel Spitzer, Ottawa (CA)

(73) Assignee: Tradewind Scientific Ltd., Ottawa (CA)

( * ) Notice: Subject to any disclaimer, the term of this patent is extended or adjusted under 35 U.S.C. 154(b) by 675 days.

(21) Appl. No.: 11/042,130

(22) Filed: Jan. 26, 2005

(65) Prior Publication Data

US 2005/0172526 A1    Aug. 11, 2005

Related U.S. Application Data

(60) Provisional application No. 60/539,113, filed on Jan. 27, 2004.

(51) Int. Cl.
*G01N 21/55* (2006.01)

(52) U.S. Cl. ........................................ 356/445; 356/614

(58) Field of Classification Search ......... 356/445–448, 356/600–602, 614, 622–625, 629–637
See application file for complete search history.

(56) References Cited

U.S. PATENT DOCUMENTS

| | | | | |
|---|---|---|---|---|
| 3,671,726 A | * | 6/1972 | Kerr | 702/172 |
| 4,074,104 A | * | 2/1978 | Fulkerson | 219/121.69 |
| 4,375,921 A | * | 3/1983 | Morander | 356/631 |
| 4,525,315 A | * | 6/1985 | Greten | 264/40.4 |
| 4,773,760 A | * | 9/1988 | Makkonen | 356/631 |
| 5,222,729 A | * | 6/1993 | Wallaschkowski | 271/262 |
| 5,351,126 A | * | 9/1994 | Takada et al. | 356/602 |
| 5,355,223 A | * | 10/1994 | Magome | 356/614 |
| 5,416,591 A | * | 5/1995 | Yoshimura et al. | 356/608 |
| 5,686,841 A | | 11/1997 | Stolarczyk | |
| 5,864,059 A | | 1/1999 | Sturm et al. | |
| 2003/0137673 A1 | | 7/2003 | Cox et al. | |

FOREIGN PATENT DOCUMENTS

| | | |
|---|---|---|
| CH | 666349 | 7/1988 |
| DE | 3204477 | 5/1983 |
| DE | 3317298 | 1/1985 |
| DE | 19503017 | 9/1995 |
| JP | 2000121749 | 4/2000 |

* cited by examiner

*Primary Examiner*—Sang Nguyen
(74) *Attorney, Agent, or Firm*—Teitelbaum & MacLean; Neil Teitelbaum; Doug MacLean (57) ABSTRACT

The present invention relates to the measurement of the depth of a contaminant, e.g. snow, found on a roadway or runway from a moving vehicle by measuring the distance between where a beam of light hits the upper surface of the contaminant and where the beam of light should have hit the roadway or runway based on the position of the light source. To eliminate the effects of pitch and roll on the measurements a second light source provides a reference spot, whereby the contaminant depth calculations can be performed independent of the distance between the roadway or runway and the light sources. A video recording device, such as a digital camera, is used to capture images of the spots, whereby the distances can be measured by adding the number of pixels between the spots in the images. The present invention can also be used for determining the surface texture/roughness and the coefficient of friction of the roadway or runway by increasing the sensitivity of the recording device to capture minute changes in relative spot position, and by utilizing complex signal processing to correlate the changes in relative spot position to surface texture/roughness.

18 Claims, 10 Drawing Sheets

DETERMINING SURFACE PROPERTIES OF A ROADWAY OR RUNWAY FROM A MOVING VEHICLE

CROSS-REFERENCE TO RELATED APPLICATIONS

The present invention claims priority from U.S. patent application Ser. No. 60/539,113 filed Jan. 27, 2004, which is incorporated herein by reference.

TECHNICAL FIELD

The present invention relates to determining the properties, e.g. rolling resistance of a surface, and in particular to determining the type and/or depth of a contaminant on a roadway or a runway.

BACKGROUND OF THE INVENTION

Measuring the surface properties of roadways, and in particular runways, is becoming an important part of travel safety, and in determining when and what kind of surface maintenance is required. Aircraft pilots require up to the minute runway condition reports, including the depth of the snow and the consistency, e.g. powder or slush. Devices for measuring the depth of snow range from in-situ sensors, such as those disclosed in German Patent Publications Nos. 3204477 published May 5, 1983 in the name of Wilfried Fritzshe, and 3317298 published Jan. 3, 1985 in the name of Zillober et al, and U.S. Pat. No. 5,686,841 issued Nov. 11, 1997 to Stolarczyk to portable probes for inserting into the snow, such as those disclosed in German Patent Publication No. 19503017, published Sep. 28, 1995, and U.S. Pat. No. 5,864,059 issued Jan. 26, 1999 to Sturm et al. Japanese Patent Publication No. 2000121749 published Apr. 28, 2000 to Taminoe et al, discloses a snow depth measuring device that measures the phase difference between a light directed at the snow and that of the reflected light. All of the aforementioned systems simply measure the snow in a single spot, and therefore require multiple measurements to obtain, at best, an average value.

Vehicle mounted systems for measuring the surface roughness of roadways are disclosed in U.S. Patent Publication 2003/137673 published Jul. 24, 2003 in the name of Cox et al, and Swiss Patent No. 666349 issued Jul. 15, 1988 to Slavko Mesaric. Cox et al relies on phase profilometry, i.e. uses shadows for contrasting the surface, to generate a 3-D profile of a surface. Mesaric, on the other hand, measures the distortion of light strips marked along the surface of the road. Neither system provides a simple and easy system for measuring the characteristics of a surface, in particular snow or contaminant depth, while moving along the surface thereof.

An object of the present invention is to overcome the shortcomings of the prior art devices by providing a relatively inexpensive and simple device for measuring the surface characteristics of a roadway or runway, while driving thereon.

SUMMARY OF THE INVENTION

Accordingly, the present invention relates to a device for analyzing a characteristic of a material having an upper surface comprising:

a first light source for directing a first beam of light at a first beam angle onto the upper surface forming a first spot;

an image recording device for capturing an image of the first spot on the upper surface; and computational means for determining the characteristic of the material based on the position of the first spot in the image relative to a reference point.

BRIEF DESCRIPTION OF THE DRAWINGS

The invention will be described in greater detail with reference to the accompanying drawings which represent preferred embodiments thereof, wherein.

DETAILED DESCRIPTION

With reference to FIGS. 1 to 5, the surface property measuring system according to the present invention, generally indicated at 1, is ideally suited for measuring various characteristics, e.g. kind, depth and consistency, of a contaminant 2, e.g. snow or water, found on roadway or a runway 3 from a moving vehicle 4.

Figure 1:
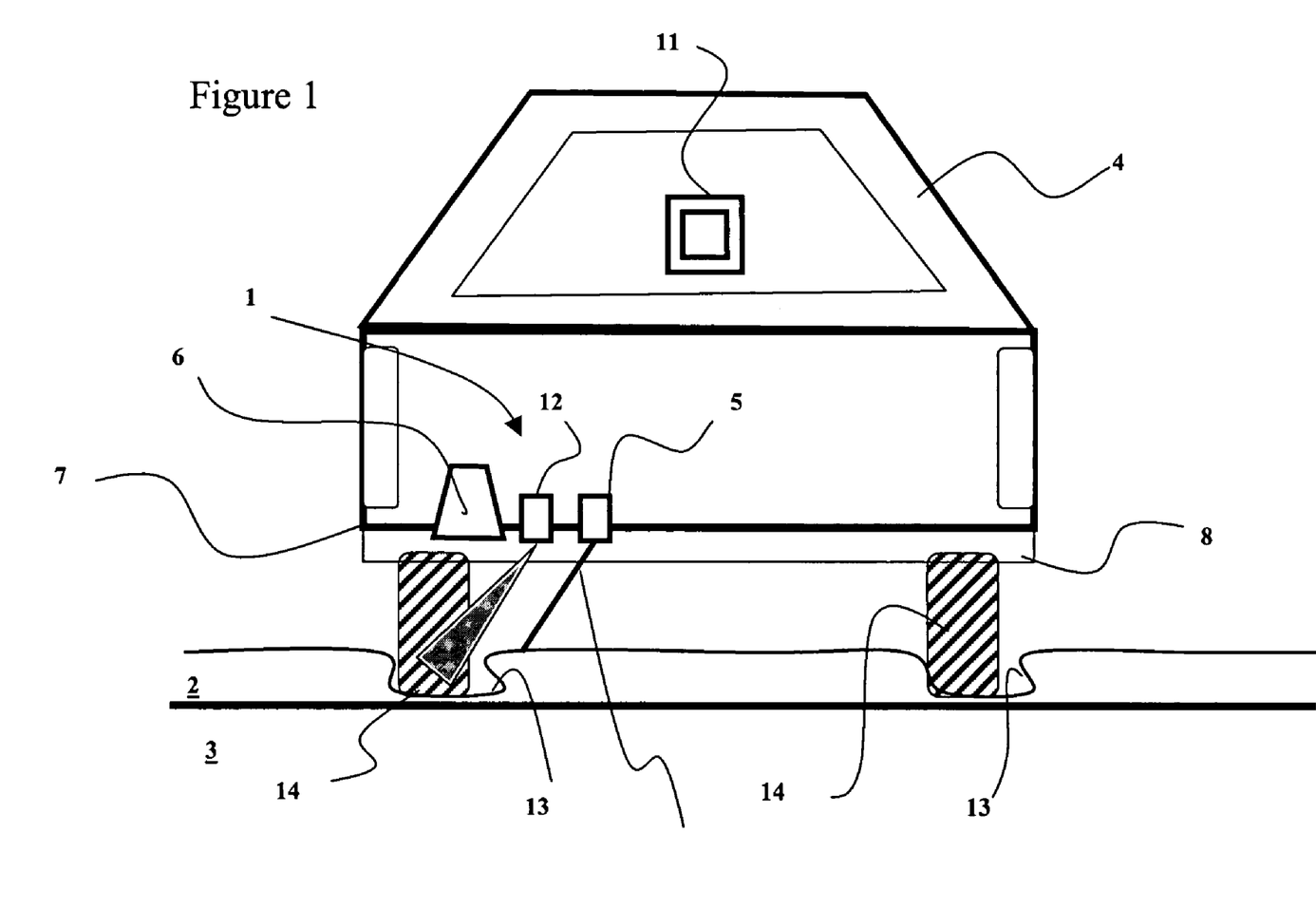
FIG. 1 illustrates a first embodiment of the present invention mounted on the rear bumper of a vehicle.
Figure 2:
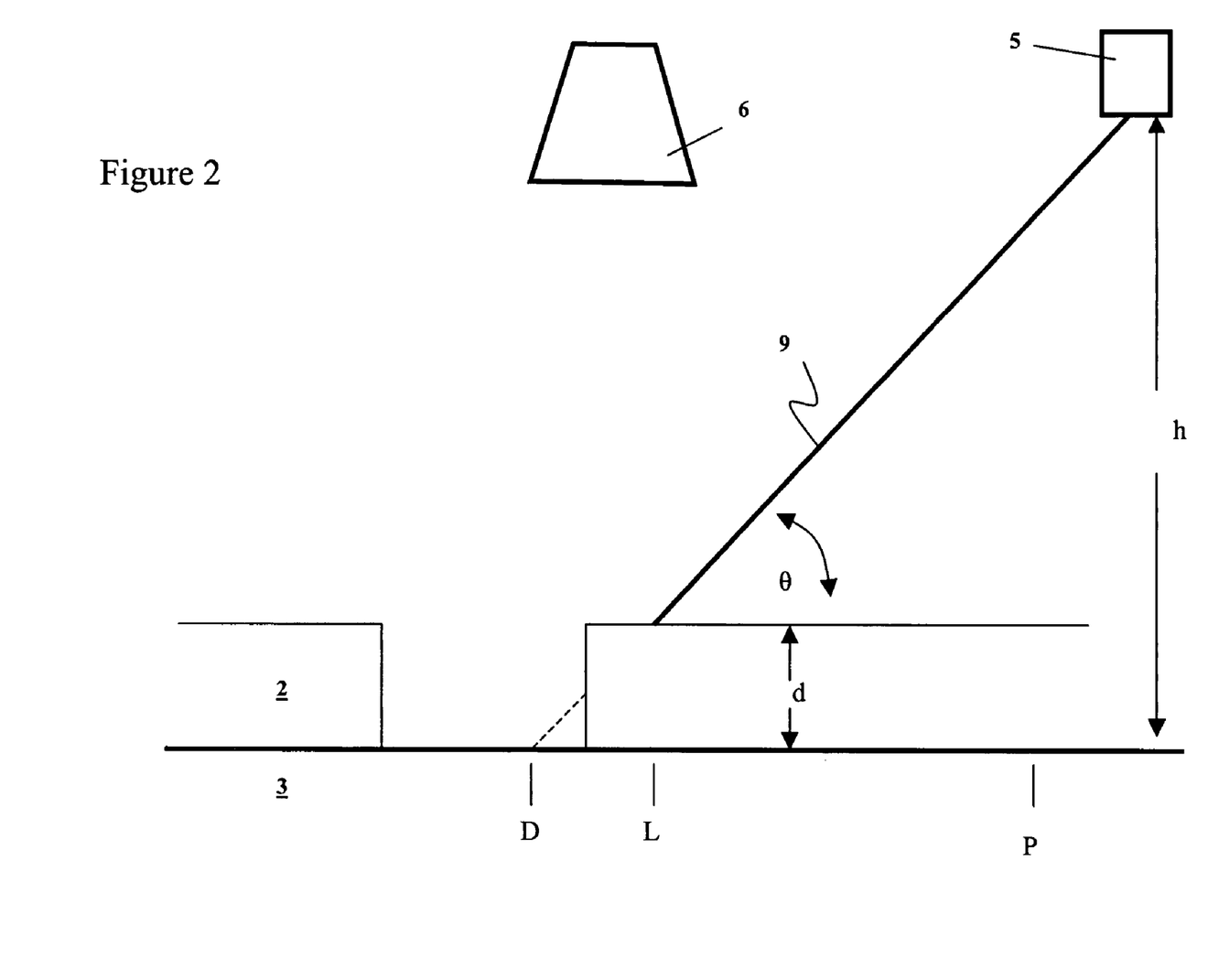
FIG. 2 is a schematic representation of the area around the vehicle tire track of FIG. 1.
Figure 3:
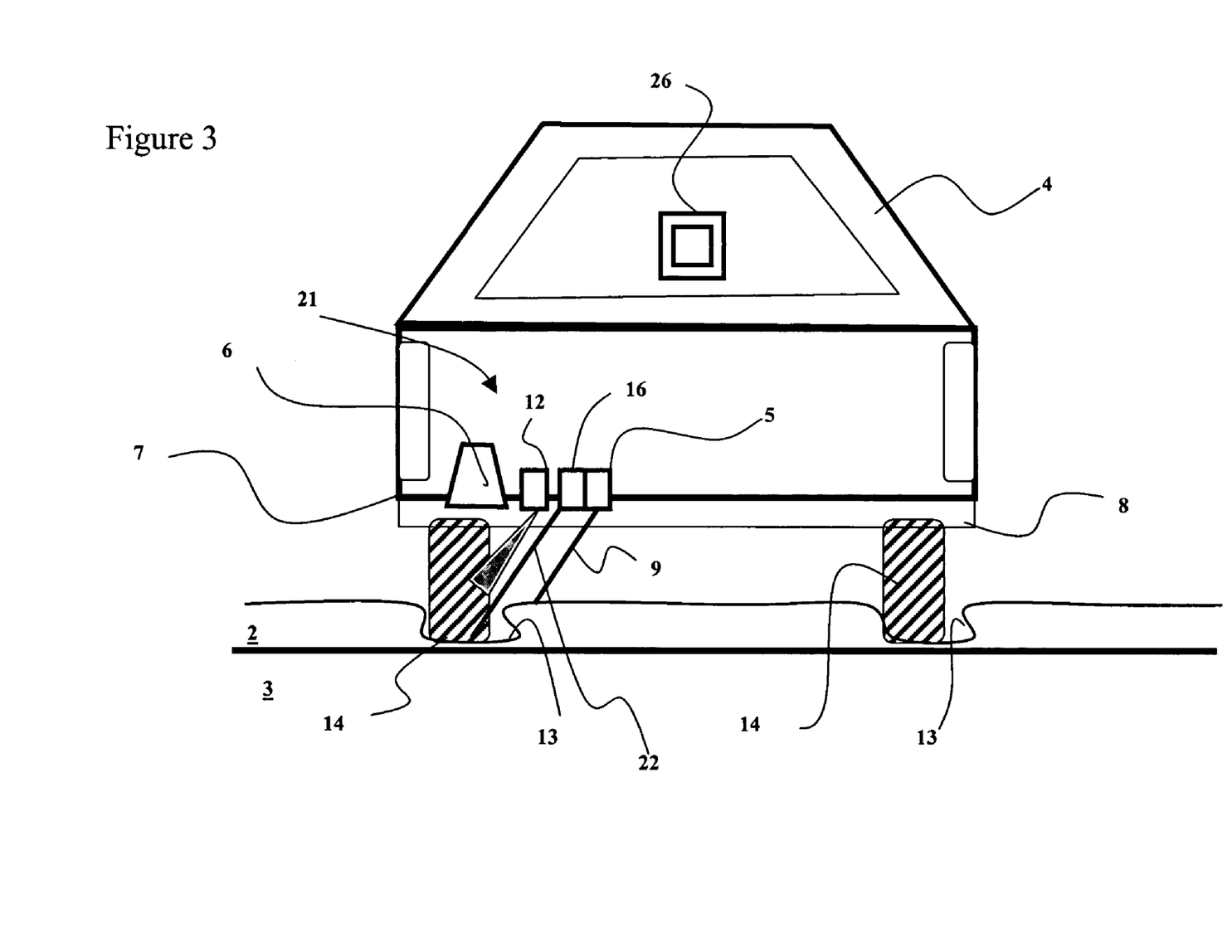
FIG. 3 illustrates a second embodiment of the present invention mounted on the rear bumper of a vehicle.

A simple embodiment of the present invention for measuring contaminant depth is illustrated in FIG. 1, and includes a spot light source 5, such as an LED, laser or lamp assembly, and an image viewing and recording device 6, such as a video camera, a digital camera or an imaging charge-coupled device (CCD) array mounted on a frame 7. With reference to FIG. 2, if the spot source 5 is mounted on the vehicle 4, e.g. to bumper or hitch 8, at a predetermined distance h above the roadway or runway 3 and angled at a predetermined (non 90°) angle θ, the distance DP to where the spot light beam 9 would be expected to intersect the roadway or runway 3 can be calculated, i.e. DP=h tan θ, and stored in an operating computer system 11. Preferably, the axis of the recording device 6 is positioned in line with the point D. Accordingly, the point D, e.g. the axis of the recording device 6, becomes a theoretical reference point. In operation, as the vehicle drives over the roadway or runway 3, the spot light beam 9 will intersect the upper surface of the contaminant 2 forming a spot, approximately 1 mm to 200 mm in diameter, at position L. The recording device 6 captures an image of the spot from the spot light beam 9 for comparison with the reference point D. Having already determined the position of reference point D, the distance DL can then be determined by counting the number of pixels therebetween, and the depth d of the contaminant can be calculated, e.g. d=DL/tan θ. The position of the recording device 6 will also have to be factored into the final calculation, if it is not directly over the spot created by the spot light beam 9.

To supplement the depth calculation, an additional light source 12 is provided to illuminate a tire track 13 left by the wheels 14 of the vehicle 4. If the recording device 6 is positioned over the tire track 13 a visual image of the cross-section of the contaminant 2 can be transmitted to the driver of the vehicle 4 and even to the central data collection/distribution center.

Unfortunately, the aforementioned system does not compensate for the vertical and axial roll of the vehicle 4, which will change the distance h between the light source 5 and the roadway or runway 3, and therefore the reference point D, making the subsequent calculation of depth d erroneous. An inclinometer or other suitable device (not shown) can be disposed on the vehicle proximate to the light source 5 to provide an indication that the light source 5 has moved relative to the ground for modifying the above-identified calculation. A second embodiment of the present invention generally indicated by 21, illustrated in FIGS. 3 to 7, also overcomes this shortcoming by providing a second spot light source 16 adjacent the first spot light source 5 on the frame 7 for directing a second spot light beam 22 into the tire track 13 created by the wheels 14 of the vehicle 4. The second spot light beam 22 creates a second spot at position R, which becomes a second reference point from which the distance LD can be determined without calculating the distance DP. Positioning the two spot light sources 5 and 12 in close proximity enables the depth d calculation to be performed independently of the actual height h. While the second spot R effectively indicates the position of the roadway or runway 3, i.e. the lower surface of the contaminant 2, correction factors, accounting for the thin layer of contaminant material compacted in the tire track 13, can be used to provide an even more accurate depth calculation. The correction factors would depend on the contaminant material, e.g. water, powder snow, slushy snow, and on the calculated depth d.

Figure 4:
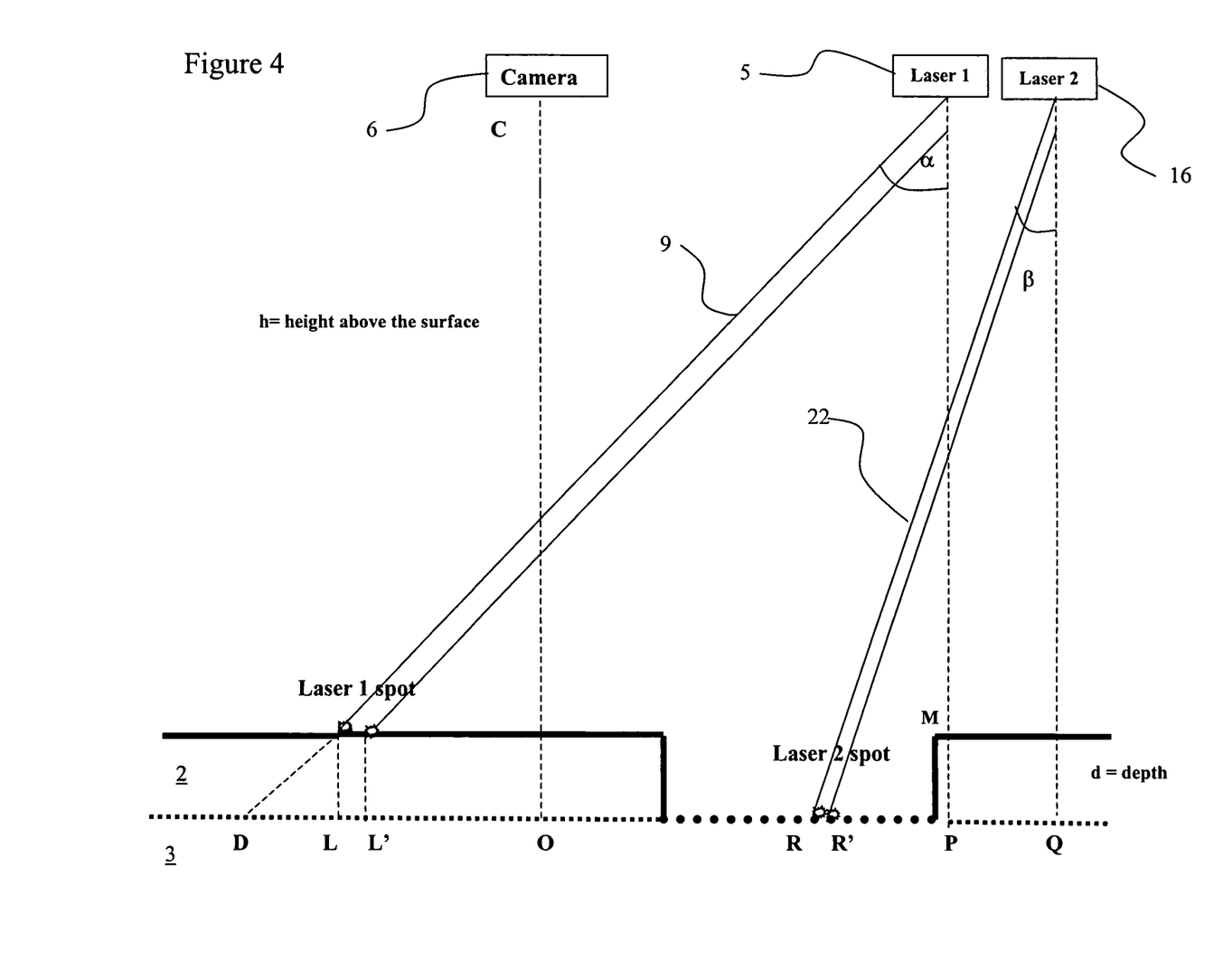
FIG. 4 schematically represents the relative relationships between the elements of the embodiment of FIG. 2.

With particular reference to FIG. 4, the distance DL can be determined by subtracting the distance between the spots LR from the total distance DR. Accordingly, the depth d becomes $d=(DR-LR)/\tan\alpha$. If the height h was constant, the distance DR could be determined, as above, by simply determining the position of the theoretical reference point D. However, since the height h is not constant an alternative calculation must be performed by operating computer system 26.

Starting with $d=(DR-LR)/\tan\alpha$ (1)

$DR=DP+PQ-RQ$ (2)

Since $RQ=h\tan\beta$ and $DP=h\tan\alpha$ $DR=h(\tan\alpha-\tan\beta)+PQ$ (3)

Since $h-d=(LO+OP)/\tan\alpha$ therefore $h=(LO+OP)/\tan\alpha+d$ (4)

substituting (4) into (3) gives $DR=(LO+OP)(\tan\alpha-\tan\beta)/\tan\alpha+d(\tan\alpha-\tan\beta)+PQ$ (5)

Substituting (5) into (1) gives $d=(LO+OP)(\tan\alpha-\tan\beta)/\tan^2\alpha+d(\tan\alpha-\tan\beta)/\tan\alpha+PQ/\tan\alpha-LR/\tan\alpha$ isolating d gives $d=(-(LO+OP)(\tan\alpha-\tan\beta)-PQ\tan\alpha+LR\tan\alpha)/(\tan\alpha\tan\beta)$ Alternatively Since $RQ=h\tan\beta=OQ-OR, h=(OQ-OR)/\tan\beta$ (6)

The distance between Laser 1 spot and $M=(h-d)\tan\alpha=LP=LR+RP$, and $RP=OQ-OR-PQ$ then $LP=LR+OQ-OR-PQ=h\tan\alpha-d\tan\alpha$ (7)

Whereby substituting (6) into (7) and solving for d gives $d=((OR(\tan\beta+\tan\alpha)-LR\tan\beta+PQ\tan\beta+OQ(\tan\alpha-\tan\beta))/(\tan\alpha\tan\alpha)$ If $\alpha=\beta$ then $d=(2OR-LR+PQ)/\tan\alpha$ Accordingly, the depth d of the contaminant can be determined from the distances between the spots LO, LR and/or OR, i.e. the number of pixels in the image, along with the equipment configuration constants $\alpha$, $\beta$, OP, PQ, and OQ independent of the height h.

Figure 5:
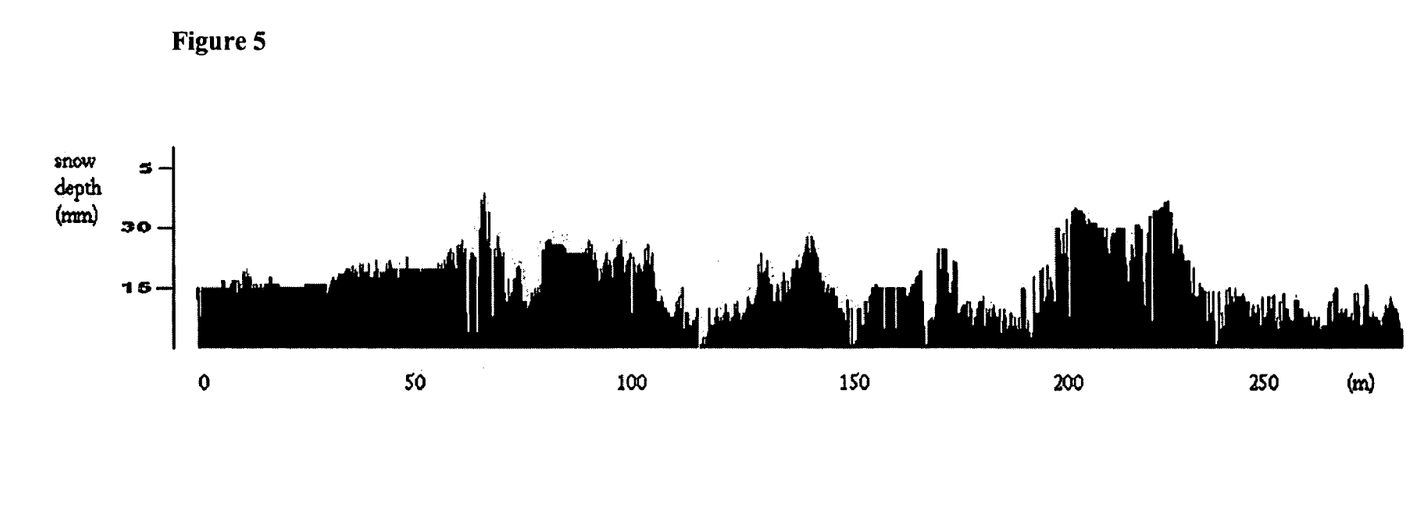
FIG. 5 illustrates a response signal from the embodiment of FIGS. 3 and 4.

A response signal is plotted in FIG. 5, which illustrates a typical example obtained from a 300 m stretch of roadway or runway. The upper portion of the signal contains many local peaks and valleys indicative of the surface texture of the contaminant 2. This portion of the signal is averaged out by the operating computer system 26 to obtain an average snow depth. The coverage of the roadway or runway 3, i.e. the % of roadway or runway with contaminant 2, can also be calculated from the response signal illustrated in FIG. 5, by simply adding all of the points with snow along the response signal (or zero points without snow) and dividing by the total distance traveled during measurement.

Figure 6:
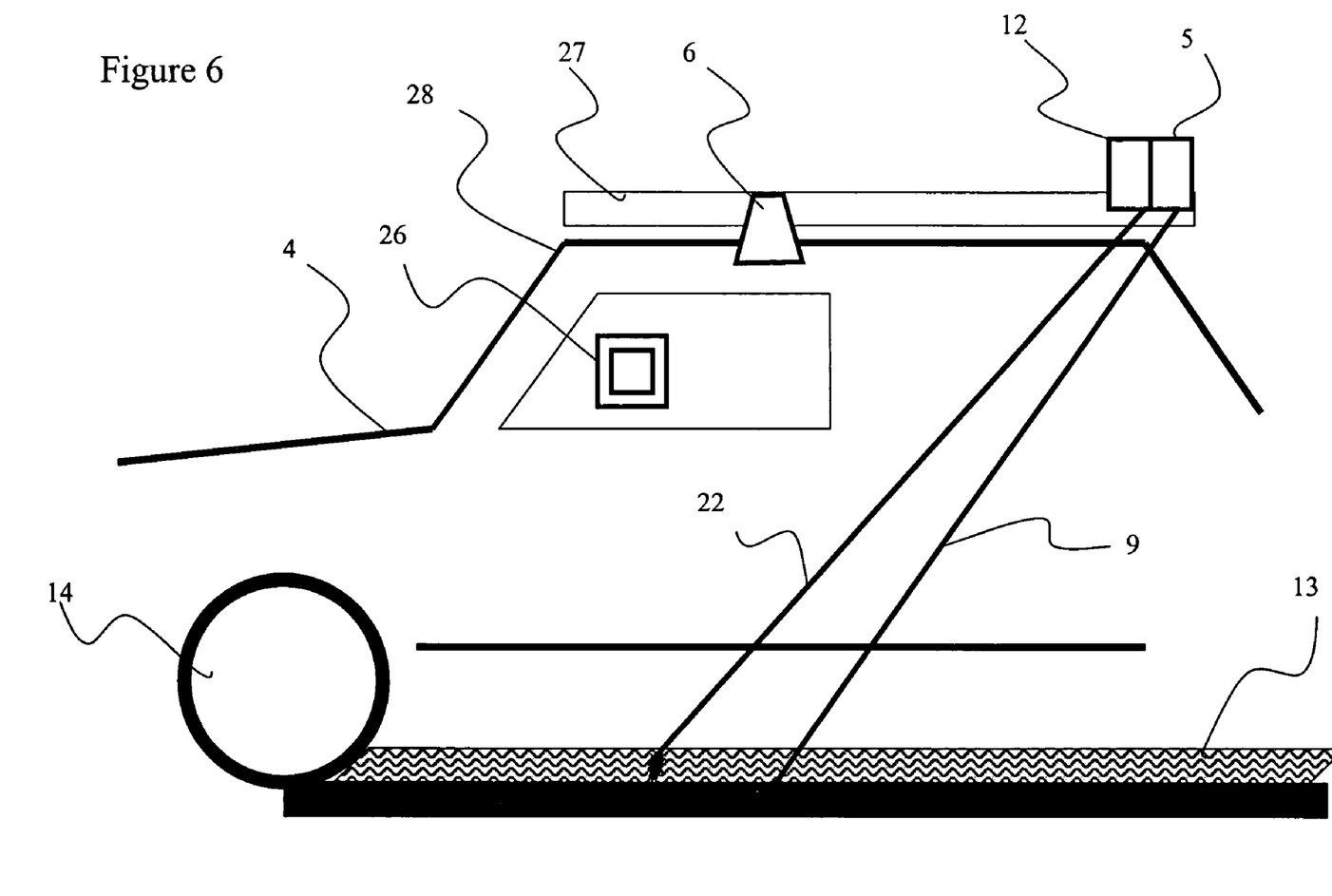
FIG. 6 illustrates the embodiment of FIGS. 2 and 3 mounted on the roof of a vehicle.

A slightly different embodiment is illustrated in FIG. 6, in which a frame 27 is mounted on a roof 28 of the vehicle 4, instead of the bumper 8. The first and second spot light sources 5 and 12, mounted on the frame 27, still direct their beams of light 9 and 22, respectively, onto the surface of the contaminant 2 and into the tire track 13, respectively. The recording device 6 can also be positioned on the frame 27 for capturing the positions of the spots L and R from beams 9 and 22.

Figure 7:
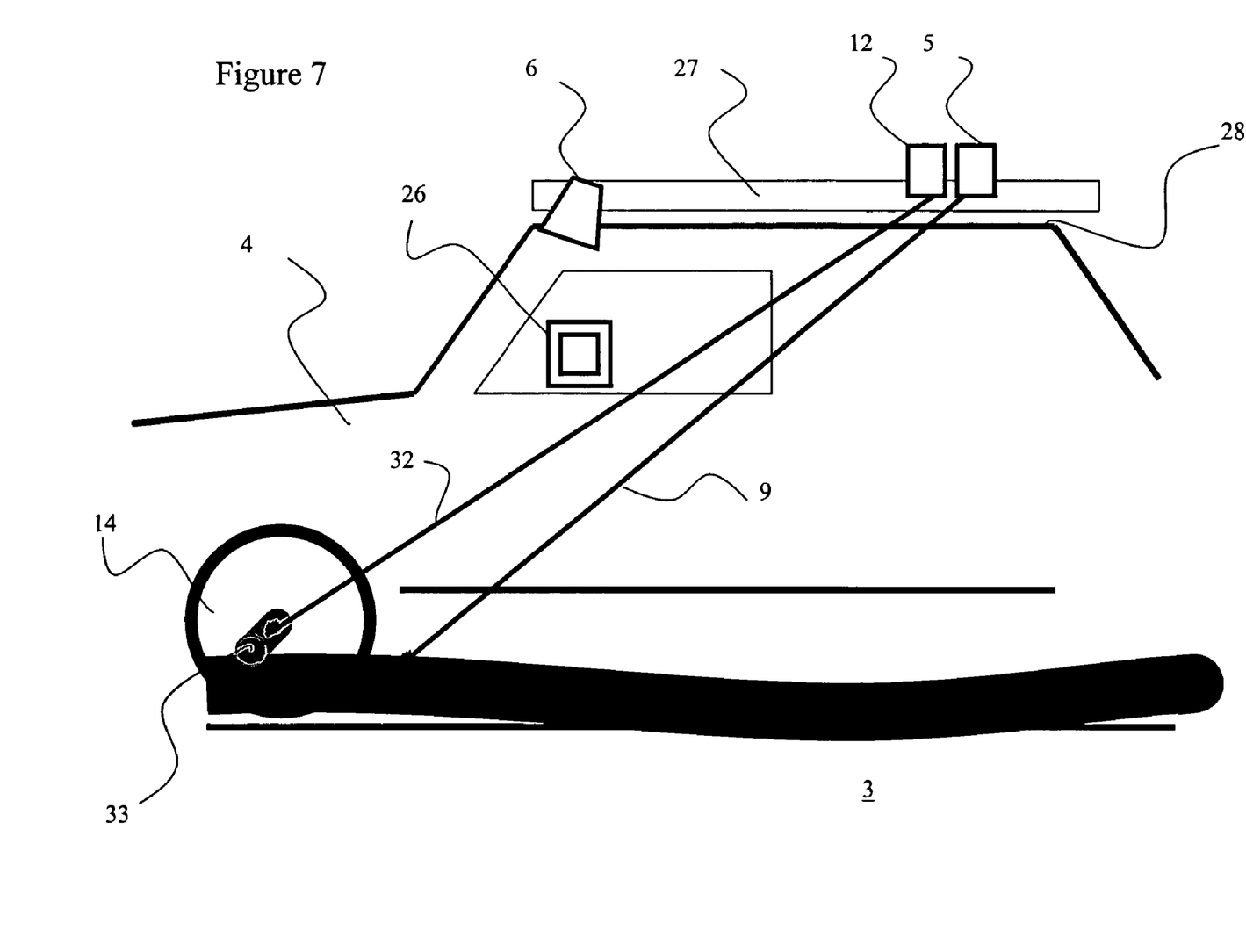
FIG. 7 illustrates an alternative to the embodiment of FIG. 6 with an axle mounted reference point.

FIG. 7 illustrates still another embodiment of the present invention, with the recording device 6 and the spot light sources 5 and 12 mounted on the frame 27 secured on the roof 28, as in FIG. 5; however, the second spot light source 12 is configured to direct a beam of light 32 onto a cylinder 33 mounted on an axle of one of the wheels 14, while the first spot light source 5 directs the beam of light 9 onto the contaminant 2 adjacent the vehicle 4. In this embodiment, the distance between the cylinder 33 and the surface 3 is assumed to be constant, whereby the depth d can be determined by the operating computer system 26 from equations similar to those above using the relative positions of the spots determined from the recording device 6.

All of the aforementioned embodiments can also be used to measure the surface roughness and texture of any surface, e.g. roadway or runway, by modifying the spatial resolution and increasing the sensitivity of the recording device 6 to measure minute fluctuations in depth, assuming the spot size is less than the required spatial resolution of the textured surface, e.g. for pavement 0.1 mm to 1.0 mm. The number of frames recorded per second may have to increased, and the recorded signal will have to be processed using dedicated techniques, such as signal frequency filtering and Fast Fourier Transformation (FFT) analysis. Accordingly, instead of measuring the depth of a contaminant relative to the roadway or runway, the system will measure the surface texture or roughness of the roadway or runway relative to a flat reference plane. In the single spot embodiment, the distance between the spot and a fixed point is measured, while in the dual spot embodiments the distance between the two spots is measured. The signal response for this embodiment will look like the upper portion of the signal response from FIG. 5, i.e. a series of local maxima and minima, which indicate when the two spots are the farthest apart and closest together. For example: a point at a maximum could represent the situation when the first spot is directed onto a peak on the surface and the second spot is directed into a valley, while a minimum could represent the situation when the first spot is directed into a valley and the second spot is directed onto a peak.

The roughness and texture of the surface can be determined from the measured signal analysis by using specific algorithms based on experimental correlations. The frequency of the vehicle's movement can be filtered out of the signal to provide a more accurate representation of the surface roughness and texture. A predicted friction coefficient for the surface can be determined based on algorithms developed from statistical (correlation/regression) analyses concerning the surface roughness and texture data in relation to friction measurement data.

Figure 8:
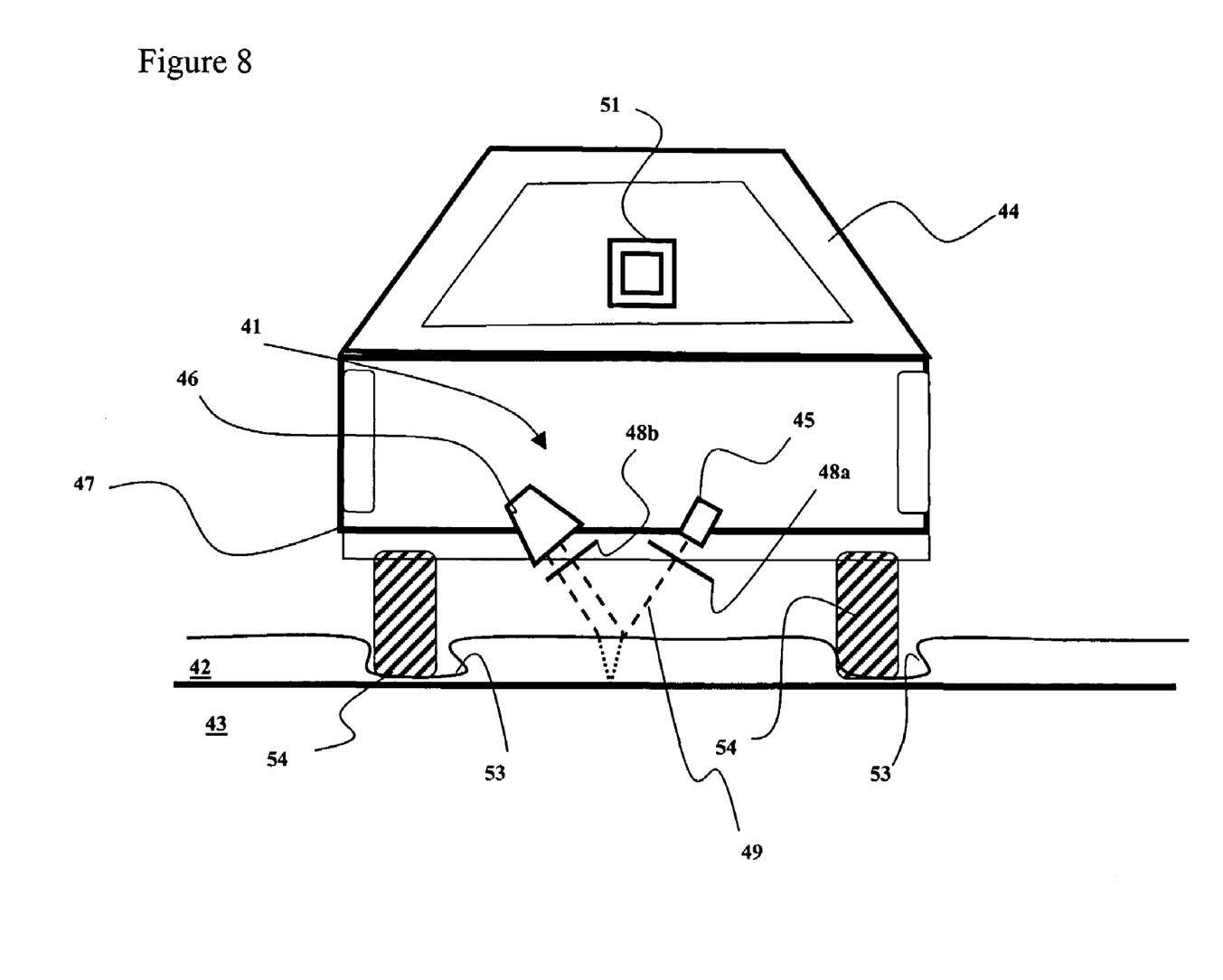
FIG. 8 illustrates a third embodiment of the present invention mounted on the rear bumper of a vehicle.
Figure 9:
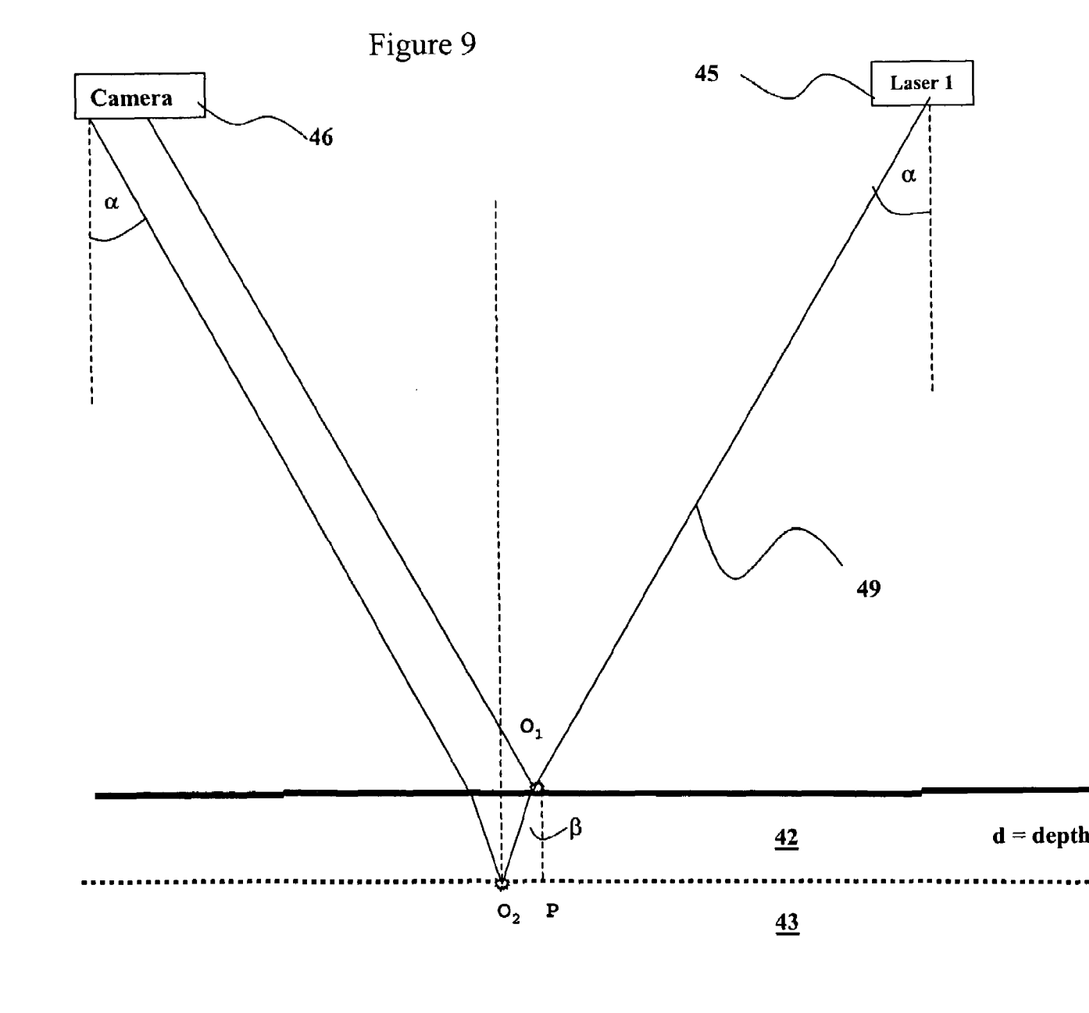
FIG. 9 schematically represents the relative relationships between the elements of the embodiment of FIG. 8.

With reference to FIGS. 8 and 9, the type of the contaminant 42 and the depth d of the contaminant above the surface 43 can be determined with another embodiment of the present invention generally indicated at 41 mounted on vehicle 44. The first step is to mount a light source 45 and a recording device 46 attached to a frame 47, such that a beam of light 49 will reflect off of the surface of the contaminant 42 into the recording device 46. An optical filter 48a can be placed in the path of the beam of light 49 to ensure a specific band of light is incident on the contaminant layer 42, i.e. to ensure that the contaminant layer, e.g. hydrocarbon, fluoresces. Additional spectral filters 48b are positioned in the paths of the reflected light beams for measuring the spectral transmission and/or the fluorescence of the contaminant 42. Using the spectral and/or the fluorescence information, the computer operating system 51 can determine the type of the contaminant 42.

With particular reference to FIG. 9, the second step takes advantage of the beam of light 49 refracting in the contaminant layer 42 forming a second spot at point $O_2$, which can be captured by the recording device along with the position of the first spot $O_1$. Whether the computer operating system 51 determined the type of the contaminant 42 from the spectral and fluorescence responses or whether the type of the contaminant 42 was already known, the depth d of the contaminant 42 can be determined using the index of refraction of the contaminant $n_c$, the angle α of the light source 45, and the lateral offset OP as captured by the recording device 46 between a spot on the surface of the contaminant 42 and a spot on the surface 43, which acts like a reference spot. Typically for water or water based materials an index of refraction of approximately 1.3 to 1.33 can be assumed.

Since $n_c$=sin α/sin β and d=OP/tan β

Then d=OP/n tan (arcsin α)

Ideally the frame 47 is positioned on the longitudinal axis of the vehicle 44, in between the tire tracks 53 left by tires 54, so that the depth d measurement is not influenced thereby.

If the two spots $O_1$ and $O_2$ are too close together, i.e. the diameters of the two spots $O_1$ and $O_2$ are larger than OP/2, they smear into a single spot. Accordingly, the distance OP can be derived from the shape or profile of the single spot, in accordance with known techniques, e.g. the width at 50% of the detected radiance (Gaussian) profile of the total spot footprint is proportional with the distance OP.

For Example: the relationship between the total spot width (at 50% radiance profile height) and depth d of water, using a low resolution (320×240 pixels) camera SiPix DV100. Assuming α=30°.

| Depth | 1.2 | 2.2 | 3.2 | 4.2 | mm |
|---|---|---|---|---|---|
| Spot Image Width | 2 | 3 | 4 | 5 | pixels |

Figure 10:
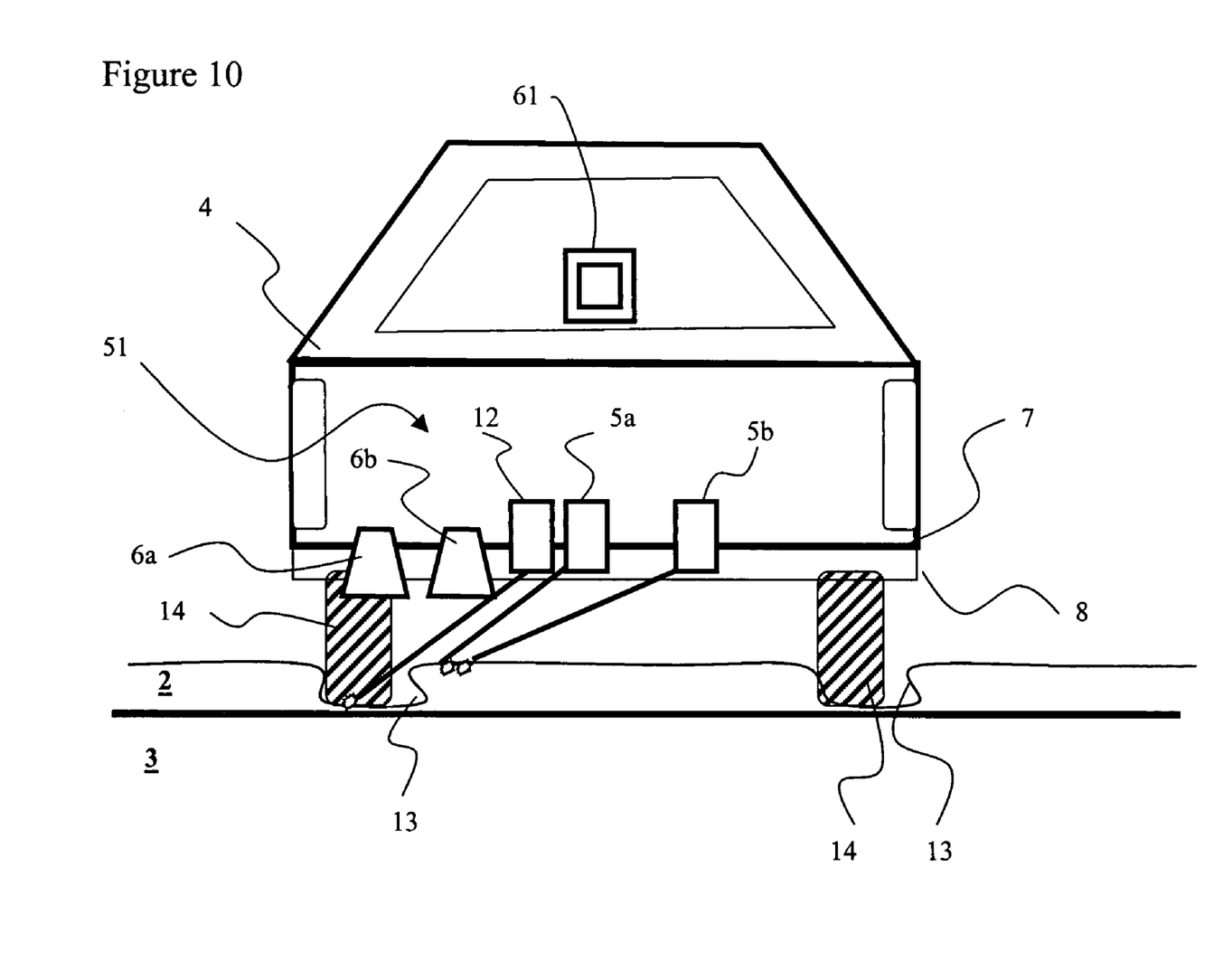
FIG. 10 illustrates a combination of the second and third embodiments.

FIG. 10 illustrates another embodiment 51 of the present invention, similar to that of FIGS. 3 to 7, including a first spot light source 5a and a first recording device 6a mounted on the frame 7, which is attached to the bumper 8 of the vehicle 4, for measuring the depth of the contaminant 2 found on the surface 3. The second spot light source 12 directs the second beam of light into the track 13 left by the tire 14, thereby providing the reference spot. A third spot light source 5b and a second recording device 6b are provided: a) for redundancy, i.e. in case the first spot light source 5a and the first recording device 5a fail, b) for higher accuracy, i.e. to provide two depth measurements at every location to more accurately compensate for both the pitch and the roll of the vehicle, and/or c) for extra measurement, e.g. for determining the type of contaminant, as in the embodiments of FIGS. 7 and 8.

An additional measurement carried out by operating computer system 61 involves identifying the type of contaminant, e.g. wet/dry snow or slush, from the size, i.e. diameter, and profile shape of the laser spot, e.g. the number of pixels over the illuminated spot, using specific correlation algorithms. The denser the contaminant, the smaller the spot size relative to a reference spot size. Accordingly, an automatic and accurate measure of the contaminants 2 density can be recorded. The size of the spot can be correlated to a simple density scale for communicating to the user or to an existing density scale already in use.

We claim:

1. A device for analyzing a characteristic of a material disposed on a lower surface, and having an upper surface comprising:
    a first light source for directing a first beam of light at a first beam angle onto the upper surface forming a first spot;
    an image recording device for capturing an image of the first spot on the upper surface; and
    computational means for determining a depth of the material based on the first beam angle and a distance between the first spot from the image and the reference point indicative of the lower surface; and
    a relative position compensator for use in calculating the depth of the material as the relative position of the first light source and the lower surface changes;
    wherein the relative position compensator comprises an inclinometer disposed proximate to the first light source for providing an accurate measure of the position of the first light source relative to the lower surface during movement of the first light source.

2. A device for analyzing a characteristic of a material disposed on a lower surface, and having an upper surface comprising:
    a first light source for directing a first beam of light at a first beam angle onto the upper surface forming a first spot;
    an image recording device for capturing an image of the first spot on the upper surface; and computational means for determining a depth of the material based on the first beam angle and a distance between the first spot from the image and the reference point indicative of the lower surface; and a relative position compensator for use in calculating the depth of the material as the relative position of the first light source and the lower surface changes;

wherein the relative position compensator comprises a second light source at a substantially different fixed position relative to the first light source for directing a second beam of light at a second beam angle onto a reference surface, which is substantially fixed relative to the lower surface, forming a second spot, which defines the reference point;

wherein the image recording device captures an image of the second spot on the reference surface; and wherein the computational means determines a depth of the material based on the first and second beam angles, the relative positions of the first and second spots, and the relative positions of the first and second light sources.

3. The device according to claim 2, further comprising a track forming means for creating a track in the material, which extends from the upper surface to the lower surface, thereby defining the reference surface; wherein the second beam of light is directed into the track.

4. The device according to claim 2, wherein the imaging recording device and the first and second light sources are mounted on a vehicle; and wherein the second beam of light is directed into a tire track created by the vehicle, thereby defining the reference surface.

5. The device according to claim 2, wherein the imaging recording device and the first and second light sources are mounted on a vehicle; and wherein the second beam of light is directed onto the reference surface, which is mounted on the vehicle proximate to the lower surface.

6. The device according to claim 5, wherein the reference surface is on a body extending from an axle of the vehicle.

7. The device according to claim 2, wherein the computational means correlates the distances between the first spot and the reference point to texture and roughness characteristics of the material.

8. A device for analyzing a characteristic of a material having an upper surface comprising:

a first light source for directing a first beam of light at a first beam angle onto the upper surface forming a first spot;

an image recording device for capturing an image of the first spot on the upper surface;

computational means for determining the characteristic of the material based on the position of the first spot in the image relative to a reference point; and a second light source for directing a second beam of light at a second beam angle onto the upper surface forming a second spot, which defines the reference point;

wherein the recording means captures a series of images of both the first and second spots; and wherein the computational means determines the relative distance between the first and second spots for each image producing a response signal indicative of the characteristic of the material.

9. The device according to claim 8, further comprising an optical filter for analyzing light reflected, back scattered or emitted from the material, whereby the computational means determines the kind of material.

10. The device according to claim 8, wherein the computational means correlates the response signal to texture and roughness characteristics of the material.

11. The device according to claim 10, wherein the computational means determines a related coefficient of friction of the material from the texture and roughness characteristics.

12. The device according to claim 8, wherein the material is disposed on a lower surface; wherein the second beam of light is directed onto a reference surface, which is substantially fixed relative to the lower surface; and wherein the computational means determines a depth of the material from the response signal, which is based on the first and second beam angles, the relative positions of the first and second spots, and the relative positions of the first and second light sources.

13. The device according to claim 12, further comprising track forming means for creating a track in the material, which extends from the upper surface to the lower surface, thereby defining the reference surface; wherein the second beam of light is directed into the track.

14. The device according to claim 12, wherein the imaging recording device and the first and second light sources are mounted on a vehicle; and wherein the second beam of light is directed into a tire track created by the vehicle, thereby defining the reference surface.

15. The device according to claim 12, wherein the imaging recording device and the first and second light sources are mounted on a vehicle; and wherein the second beam of light is directed onto the reference surface, which is mounted on the vehicle proximate the lower surface.

16. The device according to claim 15, wherein the reference surface is on a body extending from an axle of the vehicle.

17. The device according to claim 12, wherein the computation means determines a percentage of the lower surface covered by the material by comparing the number of images with or without material therein to the total number of images.

18. The device according to claim 8, wherein the computational means determines a density of the material based on the width, and profile shape of the first spot relative to a reference width.

* * * * *